US005973271A

United States Patent [19]
Fujita

[11] Patent Number: 5,973,271
[45] Date of Patent: Oct. 26, 1999

[54] GROMMET ASSEMBLY INCLUDING ELASTIC PRESSING MEMBER

[75] Inventor: Hiroo Fujita, Yokkaichi, Japan

[73] Assignee: Sumitomo Wiring Systems, Ltd, Yokkaichi, Japan

[21] Appl. No.: 08/988,631

[22] Filed: Dec. 11, 1997

[51] Int. Cl.[6] .................... H01B 17/26

[52] U.S. Cl. .................... 174/152 G; 174/153 G; 248/56; 439/471

[58] Field of Search .................... 174/152, 152 G, 174/65 G, 65 SS, 151, 153 R, 153 G, 167, 65 R, 31 R; 248/56; 439/471, 474, 475; 16/2.1, 2.2

[56] References Cited

U.S. PATENT DOCUMENTS

| | | | |
|---|---|---|---|
| 1,088,402 | 2/1914 | Burns . | |
| 1,218,216 | 3/1917 | Schmid, Jr. . | |
| 1,890,348 | 12/1932 | Weatherhead | 411/352 |
| 2,170,217 | 8/1939 | Rieman . | |
| 2,382,970 | 8/1945 | Borcherdt . | |
| 2,938,070 | 5/1960 | Morse . | |
| 3,244,802 | 4/1966 | Sturtevant | 174/153 G |
| 3,249,675 | 5/1966 | Matchen . | |
| 4,386,817 | 6/1983 | Benker et al. | 439/460 |
| 4,640,478 | 2/1987 | Leigh-Monstevens . | |
| 4,912,287 | 3/1990 | Ono et al. | 174/153 G |
| 4,983,784 | 1/1991 | Whitlock | 174/65 SS |
| 5,091,605 | 2/1992 | Clifford | 174/65 R |
| 5,321,205 | 6/1994 | Bawa et al. | 174/65 SS |
| 5,337,447 | 8/1994 | Tanaka et al. | 16/2.2 |
| 5,422,436 | 6/1995 | Zachrai . | |
| 5,614,696 | 3/1997 | Oakes . | |
| 5,639,993 | 6/1997 | Ideno et al. . | |

FOREIGN PATENT DOCUMENTS

| | | | |
|---|---|---|---|
| A1-0 076 578 | 4/1983 | European Pat. Off. . | |
| A1-0 572 012 | 12/1993 | European Pat. Off. . | |
| A1-0 580 130 | 1/1994 | European Pat. Off. . | |
| A2-0 798 166 | 10/1997 | European Pat. Off. . | |
| A1-2 701 517 | 8/1994 | France . | |
| 842 668 | 5/1952 | Germany . | |
| C1-42 25 689 | 4/1993 | Germany . | |
| 4-137432 | 12/1992 | Japan . | |
| 2115238 | 9/1983 | United Kingdom | 174/151 |
| 2125513 | 3/1984 | United Kingdom | 248/56 |

*Primary Examiner*—Dean A. Reichard
*Assistant Examiner*—Dhiru R Patel
*Attorney, Agent, or Firm*—Oliff & Berridge, PLC

[57] ABSTRACT

A grommet assembly has a main grommet body including first and second surfaces opposite one another. The first surface includes a sealing portion. An elastic pressing member operatively associated with the main grommet body applies a pressing force to the second surface. The elastic pressing member may attach to brackets provided on an exterior wall of a vehicle, e.g., an automobile. The grommet assembly may include a rigid plate member disposed between the elastic pressing member and main grommet body. The grommet assembly may include structure for substantially preventing relative rotation between the main grommet body and the elastic pressing member, structure for uniformly distributing the pressing force from the elastic pressing member to the main grommet body, and structure for supporting the elastic member in substantial alignment with the grommet body prior to assembly.

41 Claims, 20 Drawing Sheets

203
200
206
10
208
204
204
108
100
106
104
204
201
202

GROMMET ASSEMBLY INCLUDING ELASTIC PRESSING MEMBER

CROSS REFERENCE TO RELATED APPLICATION

This application is related to another U.S. patent application entitled "GROMMET ASSEMBLY AND METHOD OF ATTACHING SAME TO A VEHICLE," filed on even date herewith.

BACKGROUND OF THE INVENTION

1. Field of Invention

This invention relates to a grommet. In particular, this invention relates to a two-part grommet assembly that can be attached and removed from a vehicular wall panel.

2. Description of Related Art

Japanese Laid-Open Utility Model Hei 4-137432 discloses a typical grommet assembly. In this grommet assembly, a wire harness 5 is threaded through a hole formed in an appropriate location in a panel 2 of a vehicle, e.g., an automobile. In order to fix the grommet assembly with respect to the vehicle panel 2, a cylindrical member 28 must be inserted into a cylindrical member 24 and a fixed member 22. Once the cylindrical member 28 is fully inserted through the hole, a lip portion of the cylindrical member 24 is expanded to form a mechanical lock with an interior surface of the vehicle panel 2. At the same time, a sealing portion 25 is compressed by a flange 29 to form a seal on the exterior surface of the vehicle panel 2. See FIG. 2. Alternatively, in FIG. 5, screws 16 are provided to attach the grommet 14 to the vehicle panel 2.

This prior art assembly is disadvantageous in that it requires a large force to press the cylindrical member 28 into place. As a result, this type of grommet assembly is not suitable for large scale quantity production. In addition, because the cylindrical member 28 is a separate element, it becomes necessary to perform the inserting operation of the cylindrical member 28 a plurality of times. Thus, the assembly operation is complex.

SUMMARY OF THE INVENTION

It is an object of the present invention to provide a grommet easily assembled in an insertion hole of a vehicular body, such as an automobile.

It is a further object of the invention to assemble a grommet assembly using only a small force and a small number of operating parts, so that it is suitable for large scale production.

According to one aspect of the invention, there is provided a grommet assembly for a vehicle comprising a main grommet body having a centrally located wire harness aperture, a first surface including a sealing portion and a second surface opposite to the first surface, and an elastic spring member that applies a pressing force on the second surface.

In some embodiments of the invention, the elastic spring member is a metallic wire spring having a round cross-section. In addition, the sealing portion may include sealing lips and the elastic spring member may be aligned with the sealing lips. The grommet assembly may further include a hollow cylindrical extension protruding from the second surface that is aligned with the wire harness aperture. The grommet assembly may further include structure for maintaining the elastic spring member in close relation to the second surface prior to assembly. This structure may include a disk shaped brim or a plurality of blade members extending radially away from the hollow cylindrical extension. The grommet assembly may further include structure for uniformly distributing the pressing force from the elastic spring member to the main grommet body. This structure may include a rigid plate member interposed between the elastic spring member and the main grommet body, or a wavelike formation formed as part of the elastic spring member that contacts the second surface. Furthermore, the grommet assembly may include structure for supporting the elastic spring member in substantial alignment with the main grommet body prior to assembly. This structure may include at least one projection extending perpendicular to the second surface, a medium sized cylindrical portion formed as part of the hollow cylindrical extension, or it may be in the form of a modified bracket which includes a support surface for supporting the elastic spring member.

In some other embodiments, including those mentioned above, the elastic member may include a wire spring having open and closed ends opposite to one another. The open end may define a first bracket engaging part that engages with the first bracket mounted on a vehicle panel and the closed end may define a second bracket engaging part that engages with a second bracket mounted on a vehicle panel. The grommet assembly may further include a rigid plate member interposed between the main grommet body and the elastic spring member, and the rigid plate member may comprise a substantially U-shaped member, wherein an open end of the U-shaped rigid plate member has a width at least equal to a diameter of a hollow cylindrical portion of the main grommet body that extends away from the second surface.

According to a second aspect of the invention, there is provided a grommet assembly for attachment to a wall panel of a vehicle, comprising a main grommet body including structure for forming a waterproof seal with the wall panel and structure for applying a pressing force on the main grommet body opposite to where the waterproof seal is formed.

These and other aspects and salient features of the present invention will be described in or apparent from the following detailed description of preferred embodiments.

BRIEF DESCRIPTION OF THE DRAWINGS

Preferred embodiments of the present invention will be described with reference to the following drawings, wherein.

DETAILED DESCRIPTION OF PREFERRED EMBODIMENTS

Figure 2:
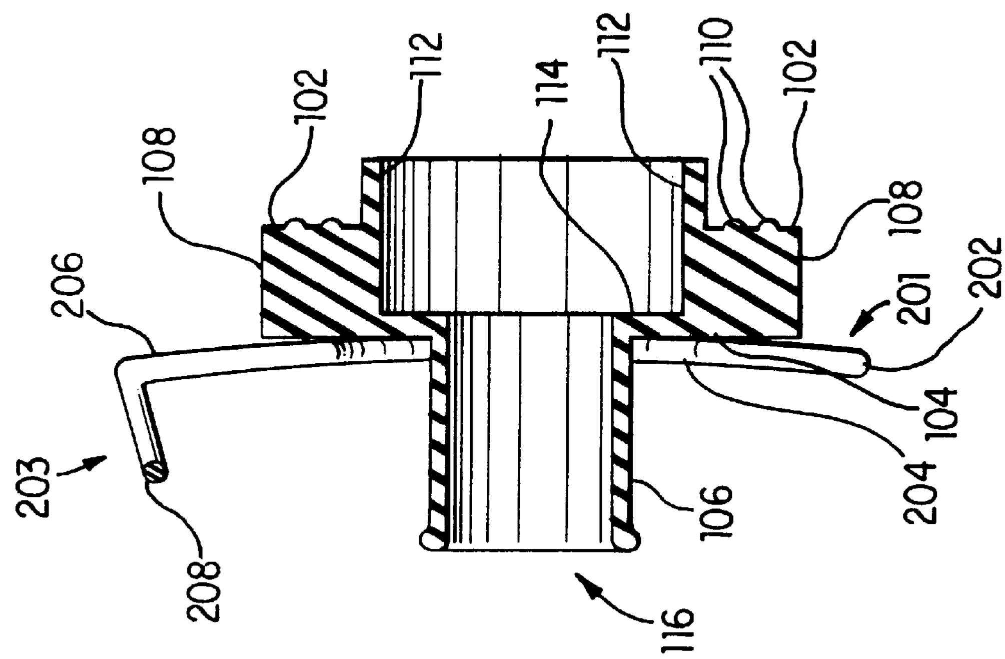
FIG. 2 illustrates a cross-section of the two-part grommet assembly of FIG. 1.
Figure 1:
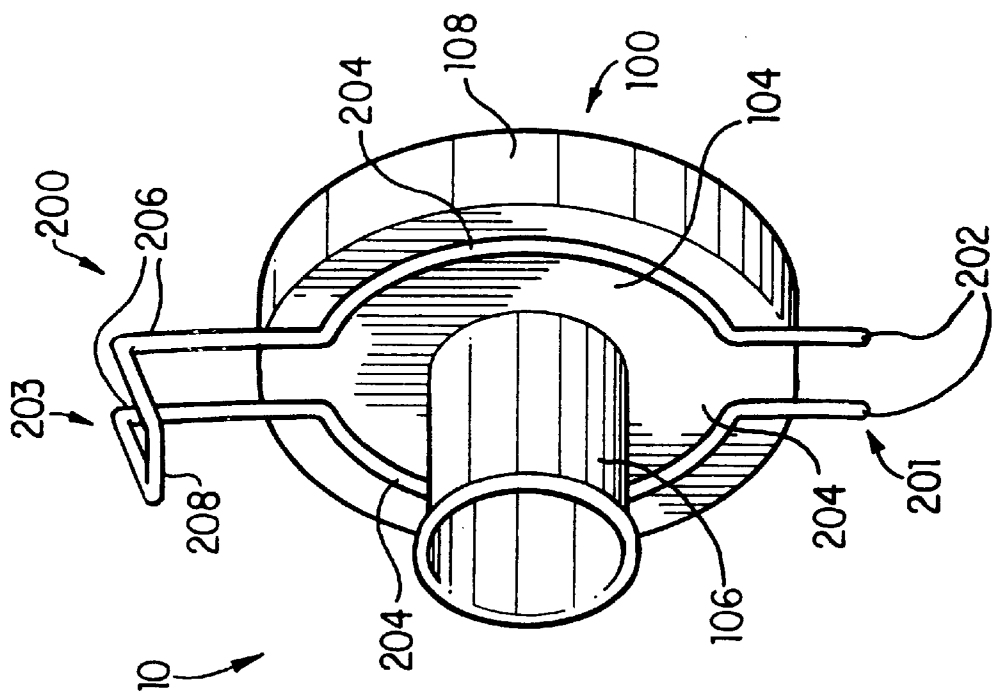
FIG. 1 illustrates a perspective view of a two-part grommet assembly according to an embodiment of the present invention.

FIGS. 1–6 illustrate a first embodiment of the present invention. In FIG. 1, a two-part grommet assembly 10 includes a main grommet body 100 and a pressing member in the shape of an elastic spring member in the form of a wire spring 200 made of a suitable metal, plastic or other material. The main grommet body 100 is made from a resilient material, e.g., rubber, and is shown as having a generally cylindrical shape. As shown in FIG. 2, the main grommet body 100 is provided with a centrally located aperture or opening 116 defined by a hollow cylindrical extension 106. The main grommet body includes a first surface 102 that includes a sealing portion including sealing lips 110. A flange 112 is located radially inside the sealing lips 110. A radial connector 114 connects the hollow cylindrical extension 106 to the outer section of the main grommet body 100. Opposite to the first surface 102 is a second surface 104. The first surface 102 and the second surface 104 are connected by a circumferential side surface 108.

The wire spring 200 includes an open end 201 and a closed end 203. The open end 201 includes two leg portions 202, and the closed end 203 includes two L-shaped leg portions 206 that are connected by a lateral connecting member 208. The open and closed ends 201, 203 overhang (i.e., extend beyond) the circumferential side surface 108 of the main grommet body 100. In addition, the open and closed ends 201, 203 are connected using semicircular portions 204 that rest against the second surface 104 of the main grommet body 100. In addition, the semicircular portions 204 contact the second surface 104 of the main grommet body 100 at a point substantially opposite to where the sealing lips 110 are formed on the first surface 102 of the main grommet body 100. As shown in FIG. 2, the lateral connecting member 208 has a round cross-section. The cross-section of the entire wire spring 200 also has a substantially round cross-section.

Figure 3:
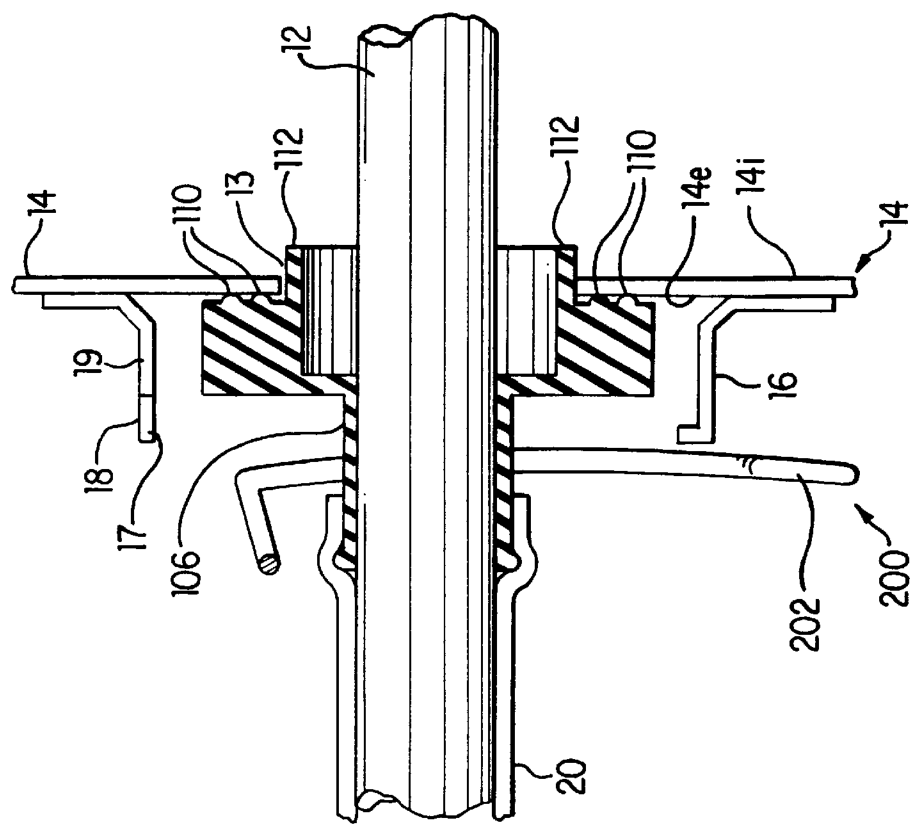
FIGS. 3–5 illustrate an assembly process for assembling the FIG. 1 grommet assembly to a vehicular wall panel.
Figure 4:
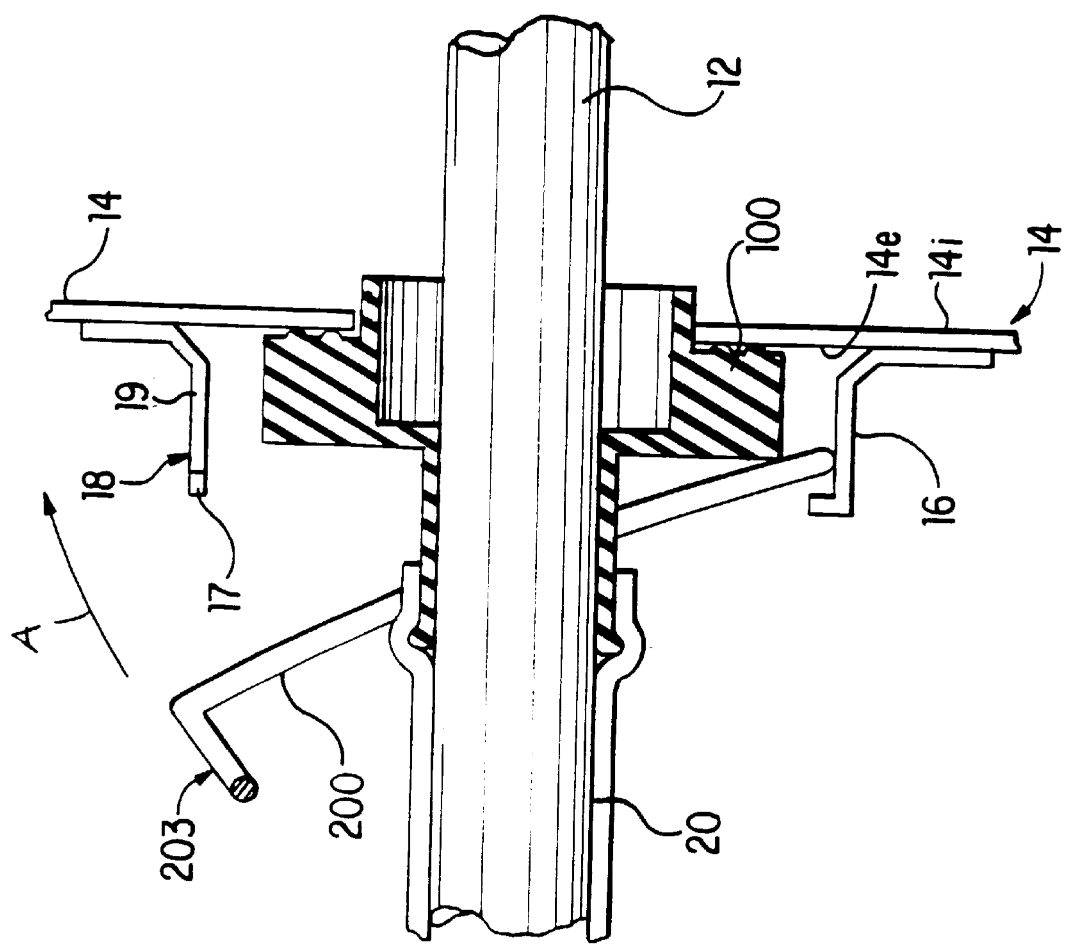
Figure 5:
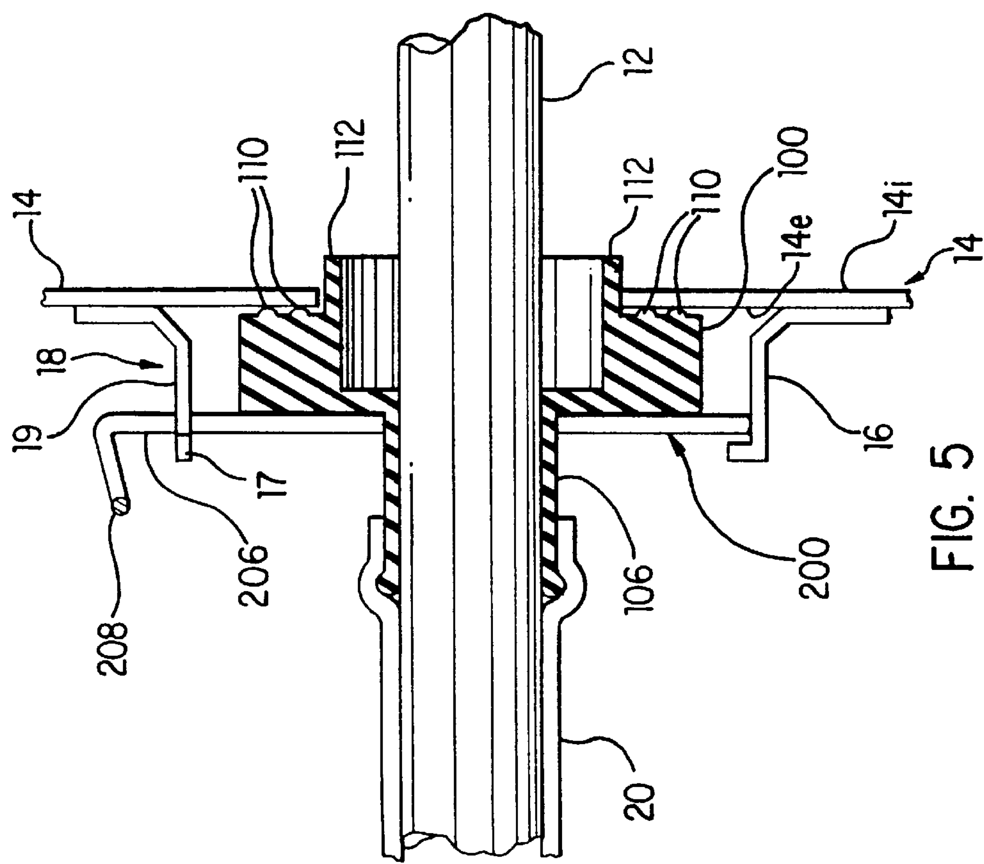

FIGS. 3–5 show a process for attaching the two-part grommet assembly 10 to a vehicular wall panel 14. The vehicular wall panel 14 includes an aperture 13 into which the main grommet body 100 is inserted. A wire harness 12 comprising a group of bundled wires is inserted through the aperture 116 (FIGS. 1 and 2) provided in the hollow cylindrical extension 106. A taped portion 20 may be provided to further enhance the waterproofing capability of the grommet assembly 10. The flange 112 of the main grommet body 100 protrudes partially within the opening 13 provided in the vehicular wall panel 14. At the same time, the sealing lips 110 come into light contact with an exterior surface **14*e* of the vehicular wall panel 14**.

The wire spring 200 is attached to first and second brackets 16, 18 to firmly secure the main grommet body 100 against the exterior surface **14*e* of the wall panel 14. Initially, the two leg portions 202 of the open end 201 of the wire spring 200 are expanded (each is moved laterally) or twisted (one is moved forward, the other is moved rearward) such that the spacing between the leg portions 202 becomes greater than the diameter of the hollow cylindrical extension 106. This enables the wire spring 200 to fit over the hollow cylindrical extension 106. However, expansion of the leg portions 202 is unnecessary if the wire harness 12 is inserted into the aperture 116 after the wire spring 200 is attached to the main grommet body 100. In other words, the spacing between the semicircular portions 204 is greater than the diameter of the hollow cylindrical extension 106 such that the wire spring 200 can easily fit over the hollow cylindrical extension 106. In FIG. 3, the wire spring 200 is supported by the hollow cylindrical extension 106**.

From the position shown in FIG. 3, the wire spring 200 is raised until the distal end portions of the two leg portions 202 engage with the first bracket 16, which is provided on (e.g., welded or affixed to) the wall panel 14. This position is shown in FIG. 4. After reaching the position shown in FIG. 4, the wire spring 200 is pivoted in the direction of an arrow A shown in the top portion of FIG. 4. The wire spring 200 is pivoted in the direction of the arrow A until reaching the position shown in FIG. 5, which shows the wire spring fixed in locked relation with respect to the second mounting bracket 18 also provided on (e.g., welded or affixed to) the vehicular wall panel 14.

Figure 6:
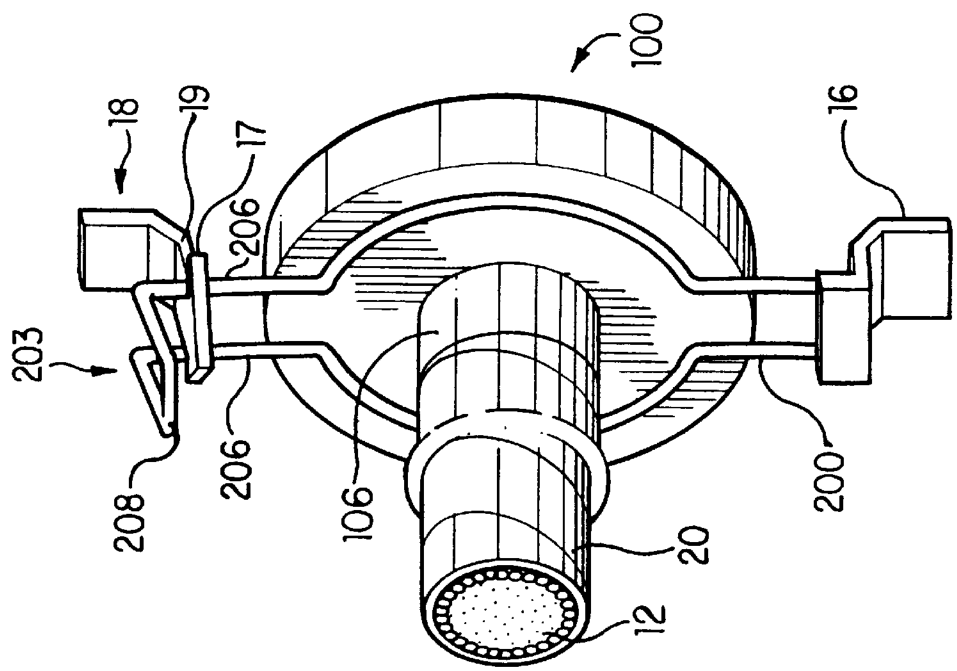
FIG. 6 illustrates a perspective view of the FIG. 1 grommet assembly in its assembled position.

As shown in FIG. 6, the first mounting bracket 16 has a simple construction and includes an S-shaped bracket that maintains the two leg portions 202 in a fixed position with respect to the wall panel 14. The second bracket 18 is an arrow shaped member including an enlarged head portion 17 and a reduced thickness portion 19. When pivoting the wire spring 200 from the position shown in FIG. 4 to the position shown in FIG. 5, the L-shaped leg portions 206 are deformed so as to expand by virtue of being pressed against the arrow shaped portion 17. In this respect, placement of the lateral connecting member 208 helps allow the L-shaped leg portions expand to overcome the size of the arrow shaped head portion 17. Also, the lateral connecting member 208 serves as a handle that is spaced from the second surface 104 when in the assembled position. However, it is not necessary for the closed end 203 of the wire spring 200 to include an L-shaped formation because the lateral connecting member 208 can be provided in the same plane as the rest of the wire spring 200.

In any event, the L-shaped leg portions 206 are expanded until reaching the reduced thickness portion 19. At that point, the L-shaped leg portions 206 return to their normal spacing, which is less than the width of the arrow shaped head portion 17. Accordingly, the closed end 203 of the wire spring 200 will be fixed in place with respect to the second bracket 18 and the vehicular wall panel 14. Also, because the open end 201 of the wire spring 200 is fixed to the first bracket 16, pivoting of the wire spring into its closed position will apply a pressing force to the second surface 104 of the main grommet body 100. As a result, the main grommet body 100 is compressed such that the sealing lips 110 provide a tight (preferably waterproof) seal against the exterior surface 14*e* of the wall panel 14.

With the two-part grommet assembly as shown in FIGS. 1–6, it is not necessary to access or modify an interior surface 14*i* of the wall panel 14. In addition, because of the simplicity in attaching the wire spring to apply the pressing force against the main grommet body 100, the assembly operation can be quickly and easily performed. In addition, because the semicircular portions 204 are substantially aligned with the sealing lips 110, the pressing force is directly applied to enhance the sealing performance between the first surface and the exterior surface of the wall panel 14. In addition, because the pressing force is evenly distributed along the semicircular portions 204, the sealing function is uniformly distributed substantially about the circumference of the main grommet body 100. Furthermore, the grommet assembly can be detached from the vehicular wall much more easily than prior art grommets.

Figure 7:
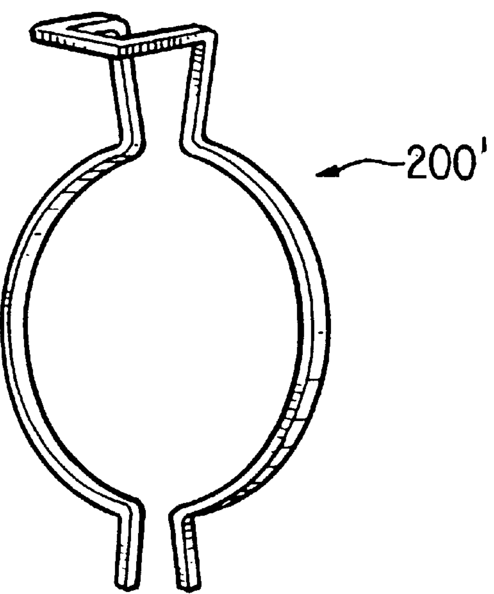
FIG. 7 illustrates a perspective view of a modified wire spring according to the present invention.

As shown in FIGS. 1–6, the wire spring 200 is shown as having an annular or round cross-section. However, other cross-sectional shapes are also within the scope of the invention so long as a uniform pressing force can be applied to the main grommet body 100. For example, as shown in FIG. 7, a wire spring 200' includes a rectangular cross-section that can be manufactured, for example, using a conventional stamping process.

Figure 8:
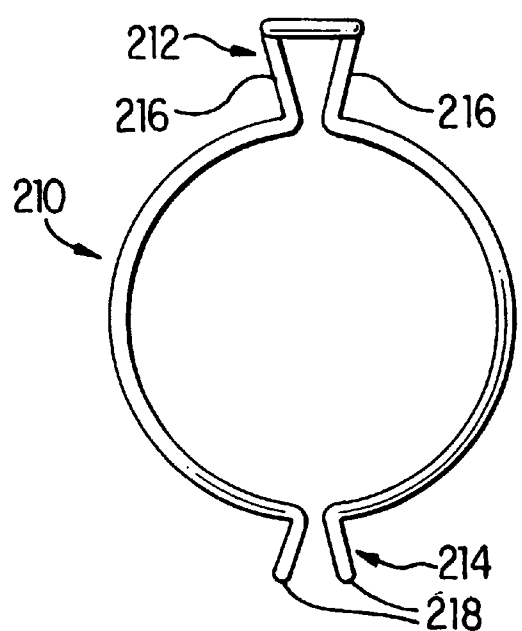
FIG. 8 illustrates a wire spring according to another embodiment of the present invention.

FIG. 8 shows a modified example of a wire spring 210. The wire spring 210 includes a modified closed end 212 and a modified open end 214. Because the closed end is substantially triangular in shape, the spacing between the L-shaped leg portions 216 is very small such that the pressure distribution is more evenly distributed along the entire circumference of the main grommet body 100. In addition, the open end 214 is substantially triangular in shape such that the spacing of the leg portions 218 of the open end 214 is also small to more uniformly distribute the pressing force.

Figure 10:
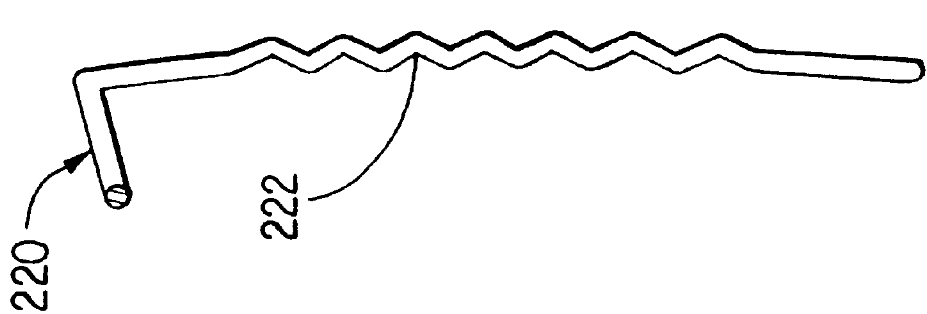
FIG. 10 illustrates a side view of the wire spring shown in FIG. 9.
Figure 9:
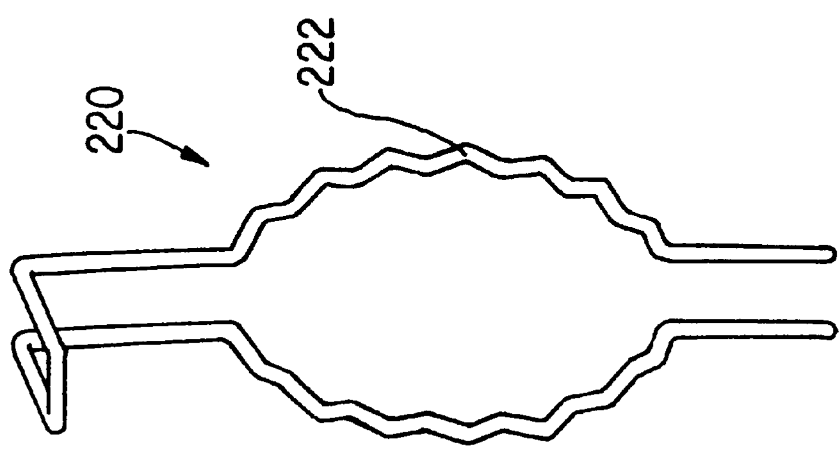
FIG. 9 illustrates a wire spring according to yet another embodiment of the present invention.

FIG. 9 illustrates yet another modified version of a wire spring 220 according to the present invention. In this wire spring, the semicircular portions are shown to include a wavelike formation 222. The wavelike formation 222 more uniformly applies the pressing force on the second surface 104 of the main grommet body 100. Thus, even if the shape of the wire spring does not exactly match the shape of the main grommet body, the waterproofing capability is maintained. Thus, manufacturing tolerance requirements are low, and the shapes of the main grommet body 100 and the wire spring 220 need not match as precisely. FIG. 10 shows a side view of the wire spring 220 shown in FIG. 9. As shown in FIG. 10, the wire spring 220 includes a slightly arched shape so as to increase the pressing force applied to the second surface 104 of the main grommet body 100.

Figure 12:
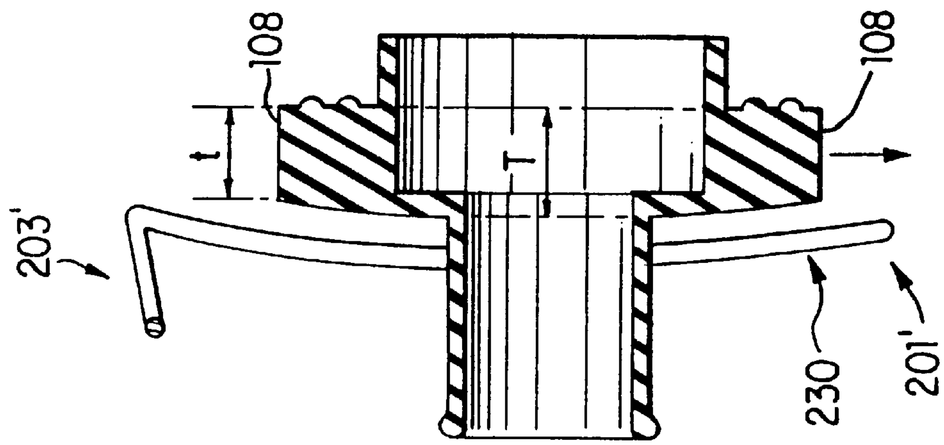
FIG. 12 illustrates a side view of the grommet assembly as shown in FIG. 11.
Figure 11:
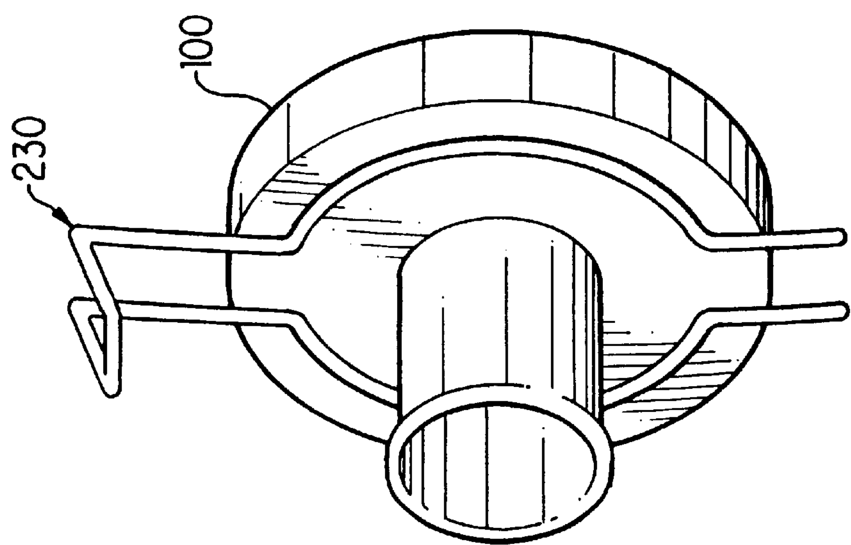
FIG. 11 illustrates a grommet assembly according to yet another embodiment of the present invention.

FIGS. 11 and 12 show a two-part grommet assembly similar to that shown in FIG. 1. However, the grommet assembly includes a wire spring 230 which is slightly different from that shown in FIG. 1. As shown in FIG. 12, the wire spring 230 includes a shape such that the open and closed ends 201', 203' of the wire spring 236 are bent towards the vehicular wall panel 14 in the assembled position. With this structure, the circumferential edge portion 108 of the main grommet body 100 is compressed to enhance the sealing effect between the sealing lips 110 and the exterior surface of the vehicular wall panel 14. Thus, the thickness T in the center of the main grommet body 100 is larger than the thickness t at the circumferential side surface 108 of the main grommet body 100. The wire spring 230 can be preformed in the shape shown in FIG. 12. However, the wire spring 230 could also be bent to create the shape shown in FIG. 12 by providing brackets 16 and 18 which are shorter than those shown in FIGS. 3–6. In either case, the effect of the structure shown in FIG. 12 is to compress the circumferential side surface 108 of the main grommet body 100 which also expands the diameter of the main grommet body 100.

Figure 15:
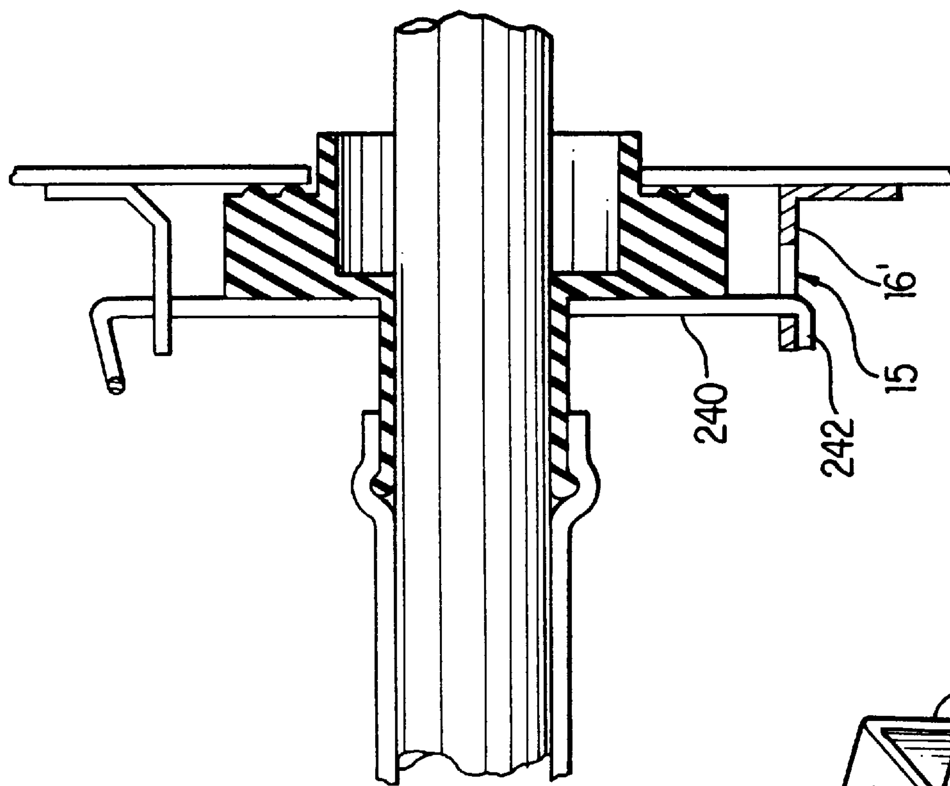
FIG. 15 shows a side view of a wire spring according to FIG. 13 in its assembled position.
Figure 13:
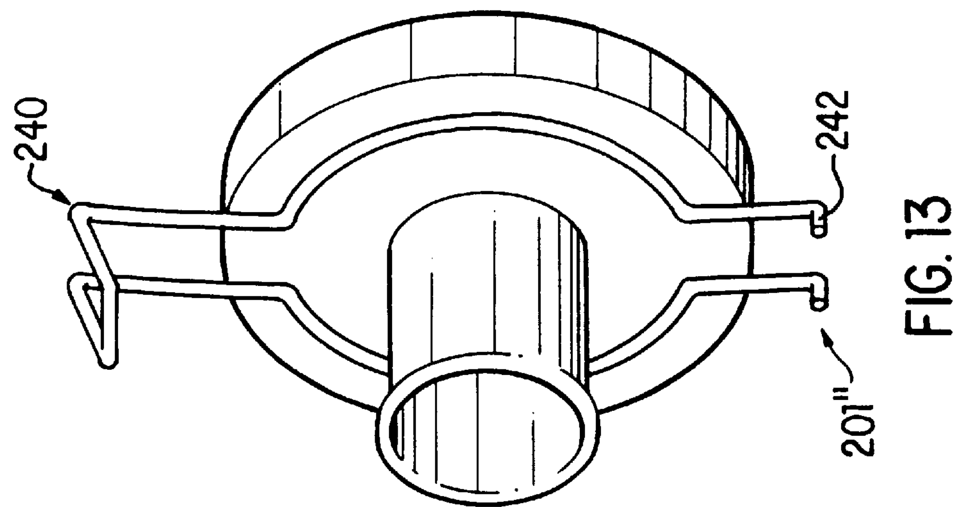
FIG. 13 illustrates a modified wire spring according to the present invention.

FIG. 13 shows a modified version of a wire spring 240. The wire spring 240 includes a pair of bent portions 242 provided at the open end 201" of the wire spring 240. The bent portions 242 of the wire spring 240 are structured to cooperate with a modified bracket 16' shown in FIG. 14. The modified bracket 16' includes a hole 15 dimensioned to receive the bent portions 242 of the wire spring 240. The assembly process is similar to that shown in FIGS. 3–5, only the bent portions 242 are inserted into the hole 15 to achieve the assembled position shown in FIG. 15. The modified bracket 16' ensures that the open end of the wire spring 240 cannot rotate with respect to the bracket 16', thus facilitating assembly and ensuring that the pressing force is maintained against the main grommet body 100. Furthermore, in the process of attaching the two-part grommet assembly 10 to the vehicular wall panel 14 in the step shown in FIG. 4, if an assembly worker accidentally pulls the wire spring 200 in the extension line direction of the closed end 203, i.e., the upward direction, the open end 201 may become detached from bracket 16. However, in this modified example, the bent portions 242 of the modified wire spring 240 are engaged with the bracket 16' so that the open end will not detach. Therefore, the assembly process becomes easy.

Figure 14:
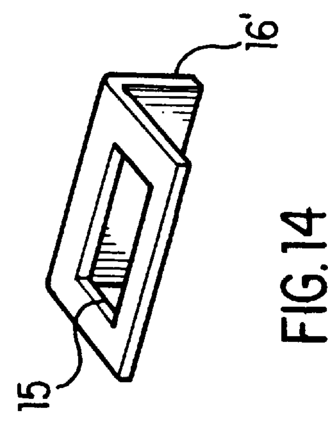
FIG. 14 illustrates a modified bracket according to the present invention.
Figure 17:
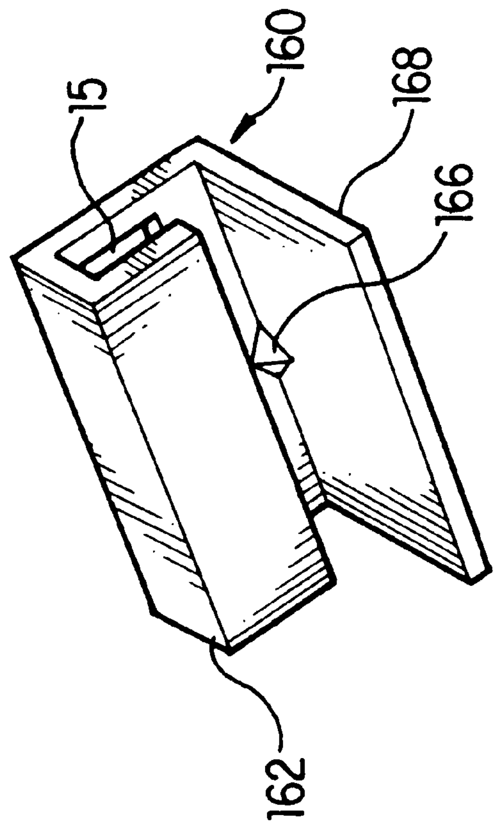
FIG. 17 illustrates a perspective view of the modified bracket shown in FIG. 16.
Figure 16:
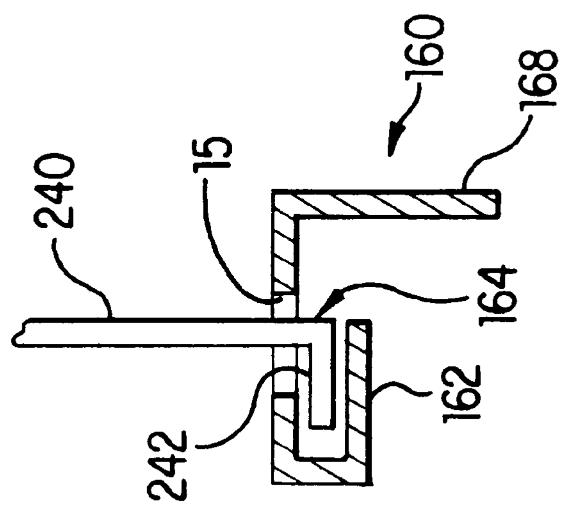
FIG. 16 illustrates a partial cross-section of a modified wire spring and modified bracket according to the present invention.

FIG. 16 shows a modified bracket 160 which includes the same basic structure as the mounting bracket 16' shown in FIG. 14. However, the mounting bracket 160 includes an L-shaped support wall 162 that is spaced opposite to where the hole 15 for the bent portion 242 of the leg is inserted. A recess 164 is created between the support wall 162 and the insertion hole 15. With this structure, the support wall 162 receives and supports the bent portion 242 of the wire spring 240. Thus, the wire spring 240 is prevented from descending and is maintained in substantial alignment with the second surface 104 of the main grommet body 100. This arrangement further facilitates the assembly process by holding the open end of the wire spring in place while the closed end of the wire spring is secured, e.g., by being snapped into place over the arrow shaped head portion 17. As shown in FIG. 16, the modified bracket 160 includes a surface 168 adapted for mounting to a vehicular wall panel 14. Also, FIG. 17 shows the modified bracket 160 as including a reinforcement 166 that helps maintain the bracket 160 in a predetermined shape.

FIGS. 18–22 show grommet modifications that assist in maintaining the wire spring in place during assembly. These modifications further ease the assembly process.

Figure 18:
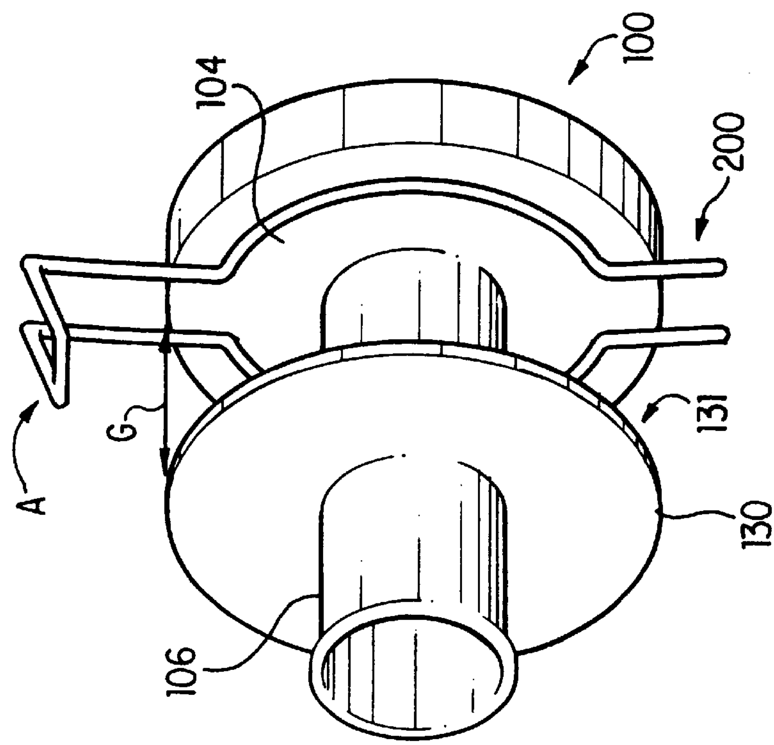
FIG. 18 illustrates a modified main grommet body according to the present invention.

FIG. 18 shows the main grommet body 100 as including a brim 130. The brim 130 is a substantially disk shaped member and is attached to the circumferential surface of the hollow cylindrical extension 106. The brim 130 has an inner surface 131 that faces the second surface 104 of the main grommet body 100 and defines a gap G between the inner surface 131 and the second surface 104 within which the wire spring 200 can move prior to assembly.

Figure 19:
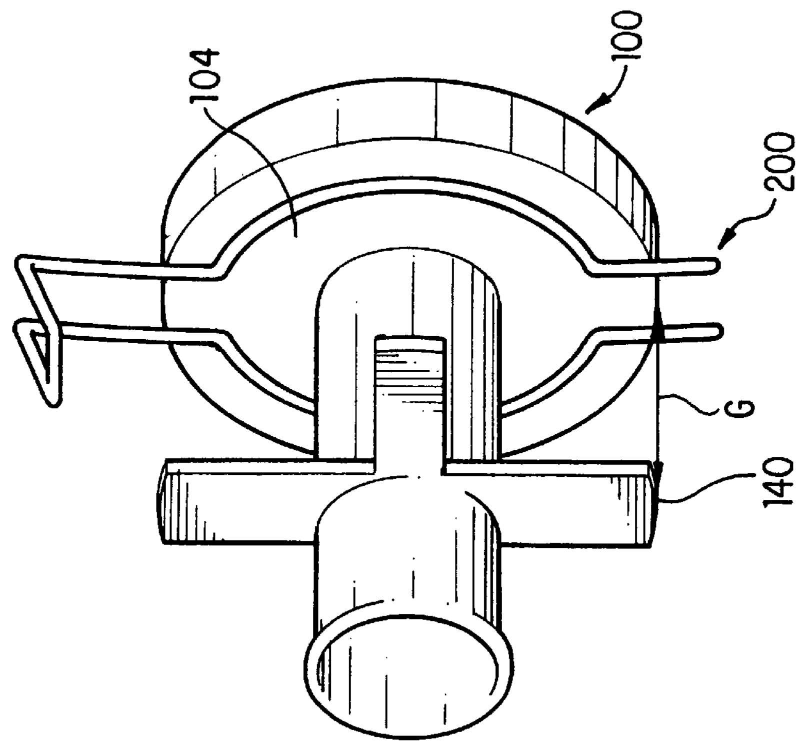
FIG. 19 illustrates yet another modified main grommet body according to the present invention.

FIG. 19 shows a modified version of the brim shown in FIG. 18. In FIG. 19, a plurality of substantially flat blade members 140 define a gap G within which the spring 200 can move prior to assembly. In both FIGS. 18 and 19, installation of the grommet assembly is facilitated because the wire spring 200 is maintained in close proximity to the main grommet body 100.

Figure 20:
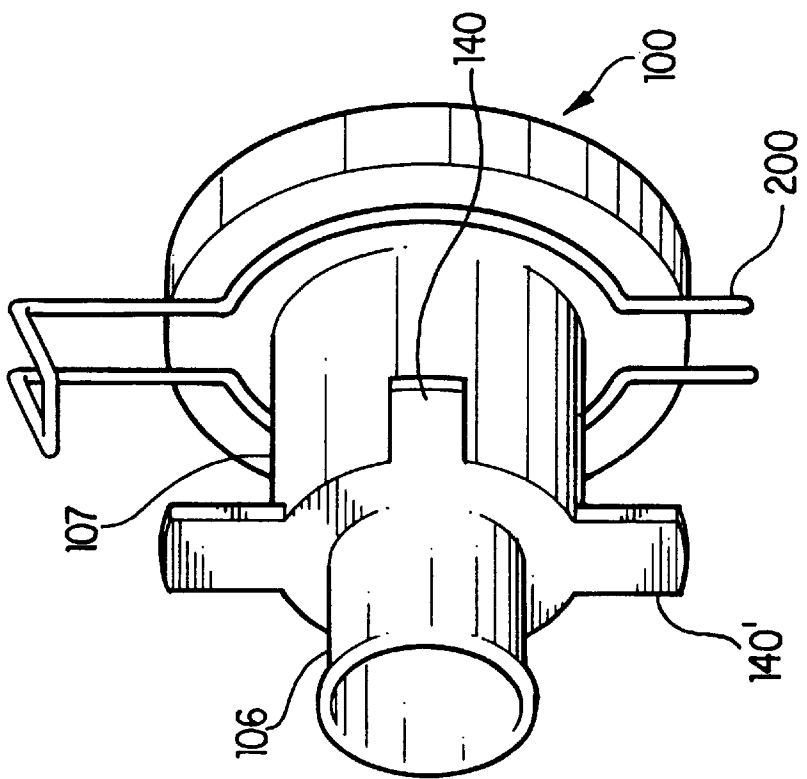
FIG. 20 illustrates still another modified version of the main grommet body according to the present invention.

FIG. 20 shows a main grommet body 100 that includes a medium sized diameter portion 107 provided between the hollow cylindrical extension 106 and the main grommet body 100. The medium sized diameter portion 107 maintains the wire spring 200 in substantial alignment with the second surface 104 of the main grommet body 100 in a position opposite to where the sealing lips 110 are positioned on the first surface 102 of the main grommet body 100. In addition, a plurality of substantially planar blade members 140' may be circumferentially disposed about and substantially between the hollow extension 106 and the medium sized diameter portion 107. The blade members 140' have substantially the same function as the brim 130 (FIG. 18) and the blade members 140 (FIG. 19).

Figure 21:
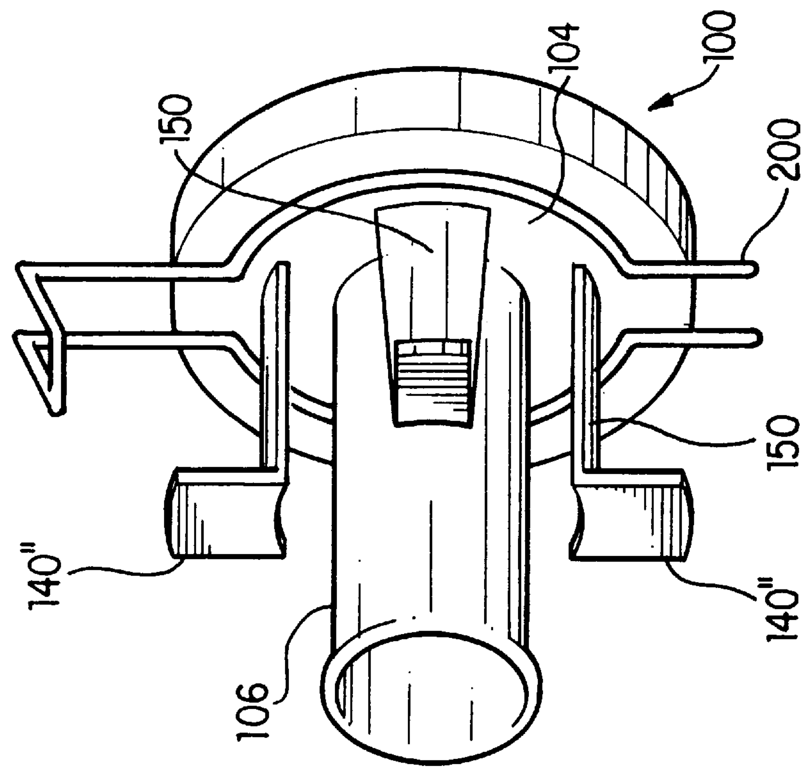
FIG. 21 illustrates still another embodiment of the main grommet body according to the present invention.

FIG. 21 illustrates a main grommet body 100 including a plurality of projections 150 extending away from the second surface 104 and parallel to the hollow cylindrical extension 106. The blade members 150 have the same function as the medium sized diameter portion 107 (FIG. 20), i.e., to maintain the wire spring 200 in substantial alignment with the main grommet body 100. In both cases, the wire spring 200 is prevented from descending. As compared to the operation shown between FIGS. 3 and 4, it is not necessary to raise the wire spring 200 to engage the open end with the bracket 14. Thus, engagement and assembly of the wire spring 200 is made easier than the embodiment shown in FIGS. 1–6.

Each of the projections 150 may also include a brim portion 140". The function and effect of the brim portions 140" are substantially identical to the brim 130 (FIG. 18) and the blade members 140 (FIG. 19) and 140' (FIG. 20).

Figure 22:
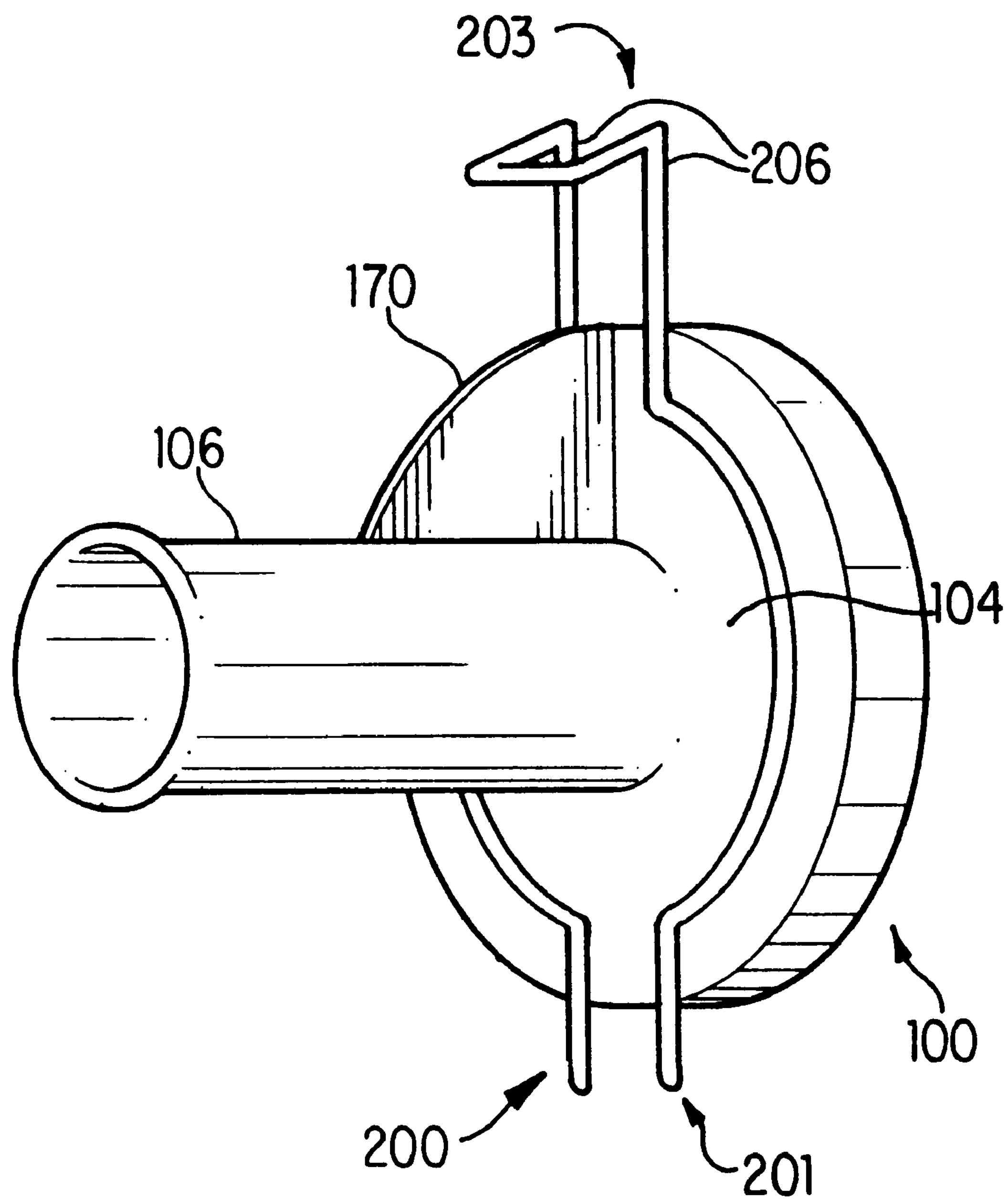
FIG. 22 illustrates yet another modified main grommet body according to the present invention.

FIG. 22 illustrates a main grommet body 100 which includes a planar guide member 170 extending from the hollow cylindrical portion 106 to the second surface 104. The guide member 170 may have a circular arc shape and can be positioned between the L-shaped leg portions 206 to properly prealign the wire spring 200 with respect to the main grommet body 100. Accordingly, the open and closed ends 201,203 of the wire spring can be easily engaged with the brackets 16 and 18.

The guide member 170 can be used in combination with the brims of FIGS. 18–21.

Figure 24:
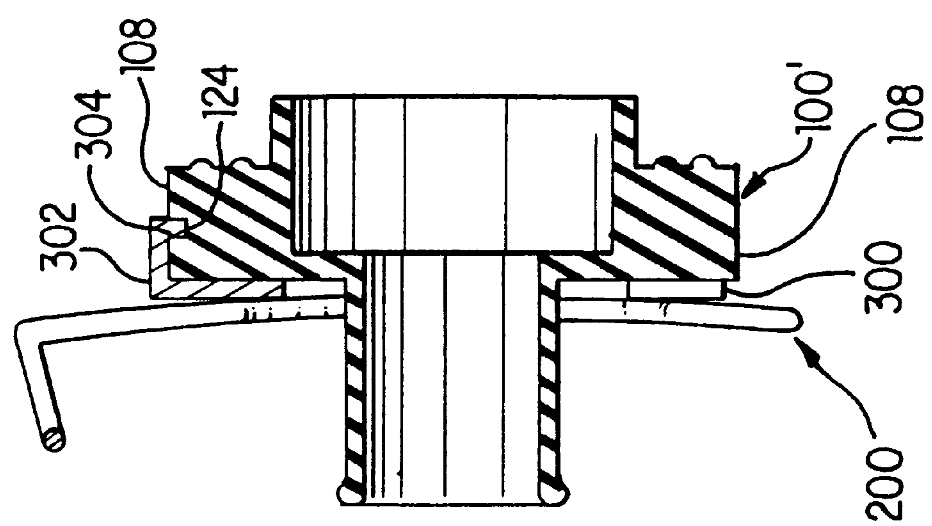
FIG. 24 illustrates a side view of the assembly shown in FIG. 23.
Figure 23:
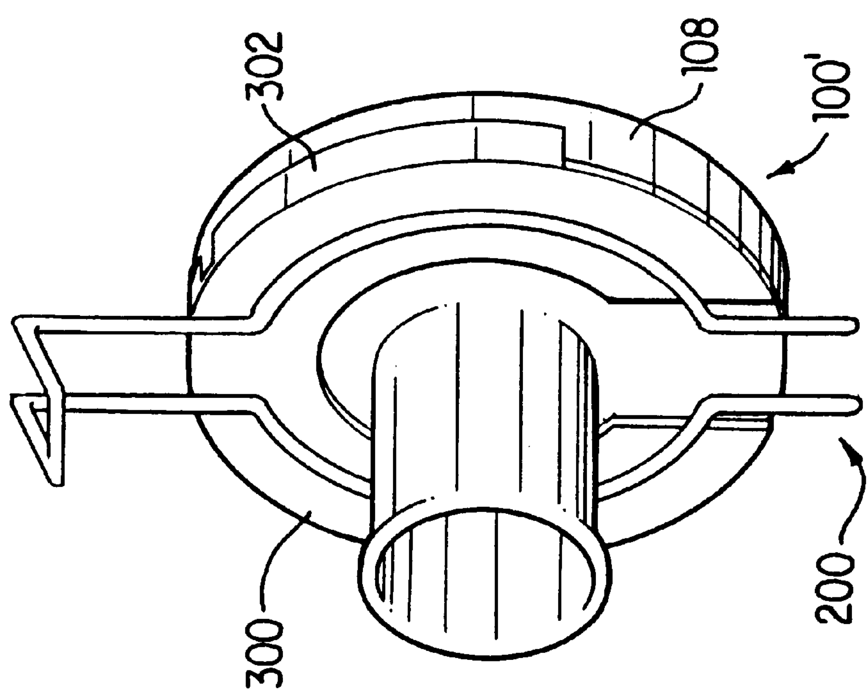
FIG. 23 illustrates a rigid plate member interposed between a wire spring and main grommet body according to the present invention.
Figure 26:
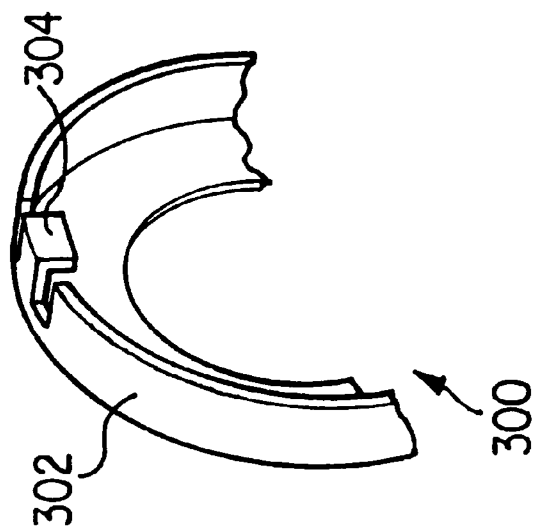
FIG. 26 is a reverse perspective view of the rigid plate member shown in FIG. 25.

FIGS. 23–26 show another embodiment of the present invention. FIG. 23 shows a substantially rigid plate member 300 interposed between the wire spring 200 and a main grommet body 100'. The rigid plate member 300 can be made of metal or synthetic resin and includes a rim portion 302 that extends about the circumferential side surface 108 of the main grommet body 100'. FIG. 24 shows a side view of the assembly shown in FIG. 23. The rim portion 302 includes an inner projection 304 that is inserted within a radial recess 124 provided on the main grommet body 100'. FIG. 26 illustrates a partial reverse perspective view of the rigid plate member 300 including the inner projection 304. The rim portion 302 and inner projection 304 hold the rigid plate member 300 in place on the main grommet body 100'.

Due to the presence of the rigid plate member 300, the pressing force applied from the wire spring 200 to the main grommet body 100 is more evenly distributed. Accordingly, waterproofing of the grommet assembly is made more uniform.

Figure 25:
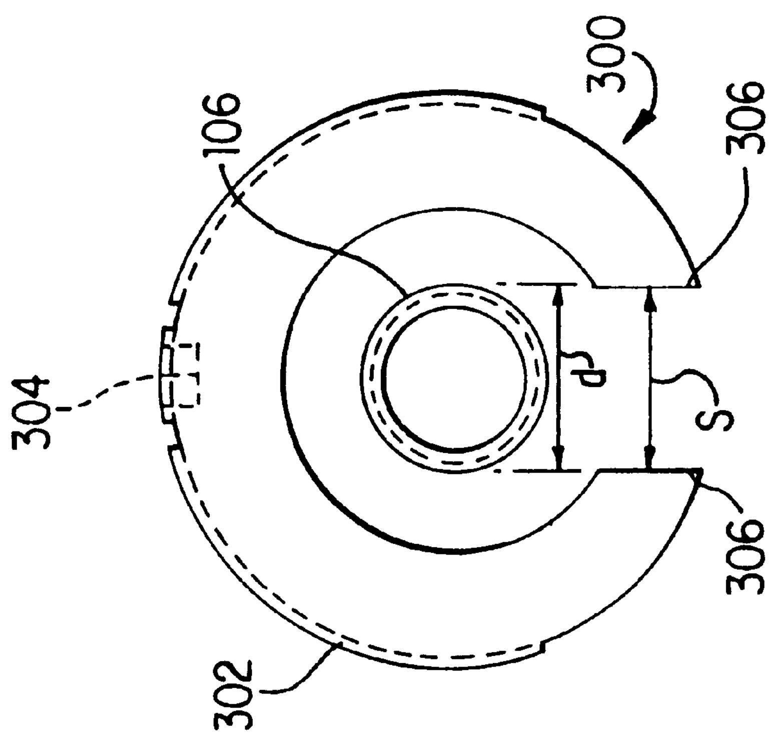
FIG. 25 illustrates a detail view of the rigid plate member of FIGS. 23 and 24.

As shown in FIG. 25, the rigid plate member 300 is an upside-down U-shaped member. The rigid plate member 300 includes ends 306 which are spaced apart a distance S. The distance S is dimensioned such that it is equal to or larger than the diameter d of the hollow cylindrical extension 106. Accordingly, the rigid plate member 300 can be slipped between the wire spring 200 and the main grommet body 100' even if the wire harness 12 is previously inserted within the opening 116 of the hollow cylindrical extension 106.

Figure 28:
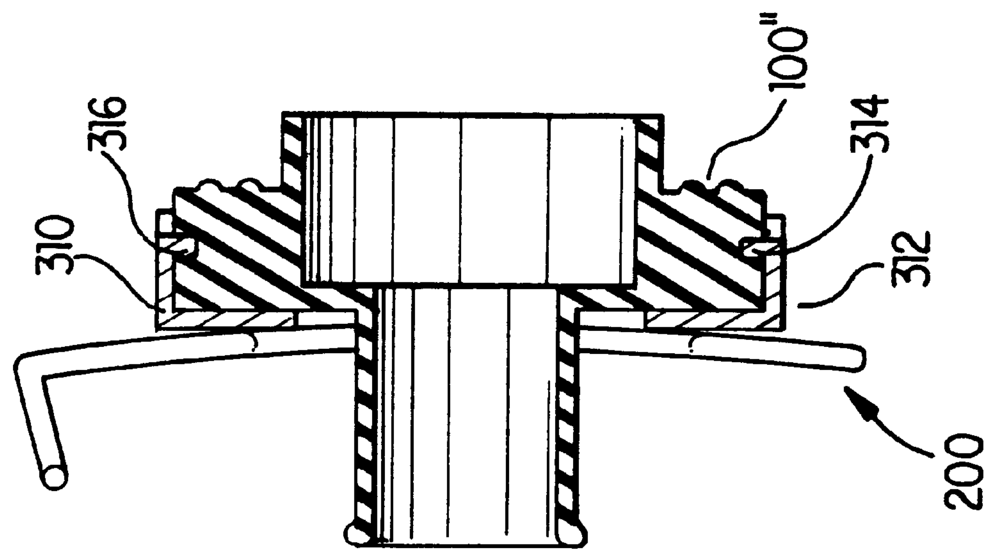
FIG. 28 is a side view of the two-part rigid plate assembly as shown in FIG. 27.
Figure 27:
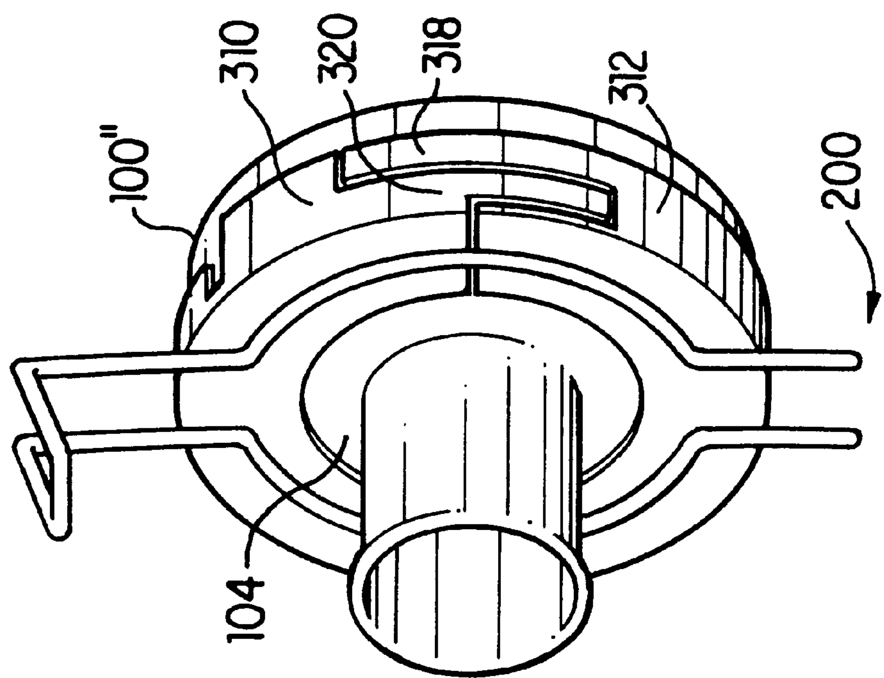
FIG. 27 is a perspective view of a modified two-part rigid plate member according to the present invention.
Figure 29:
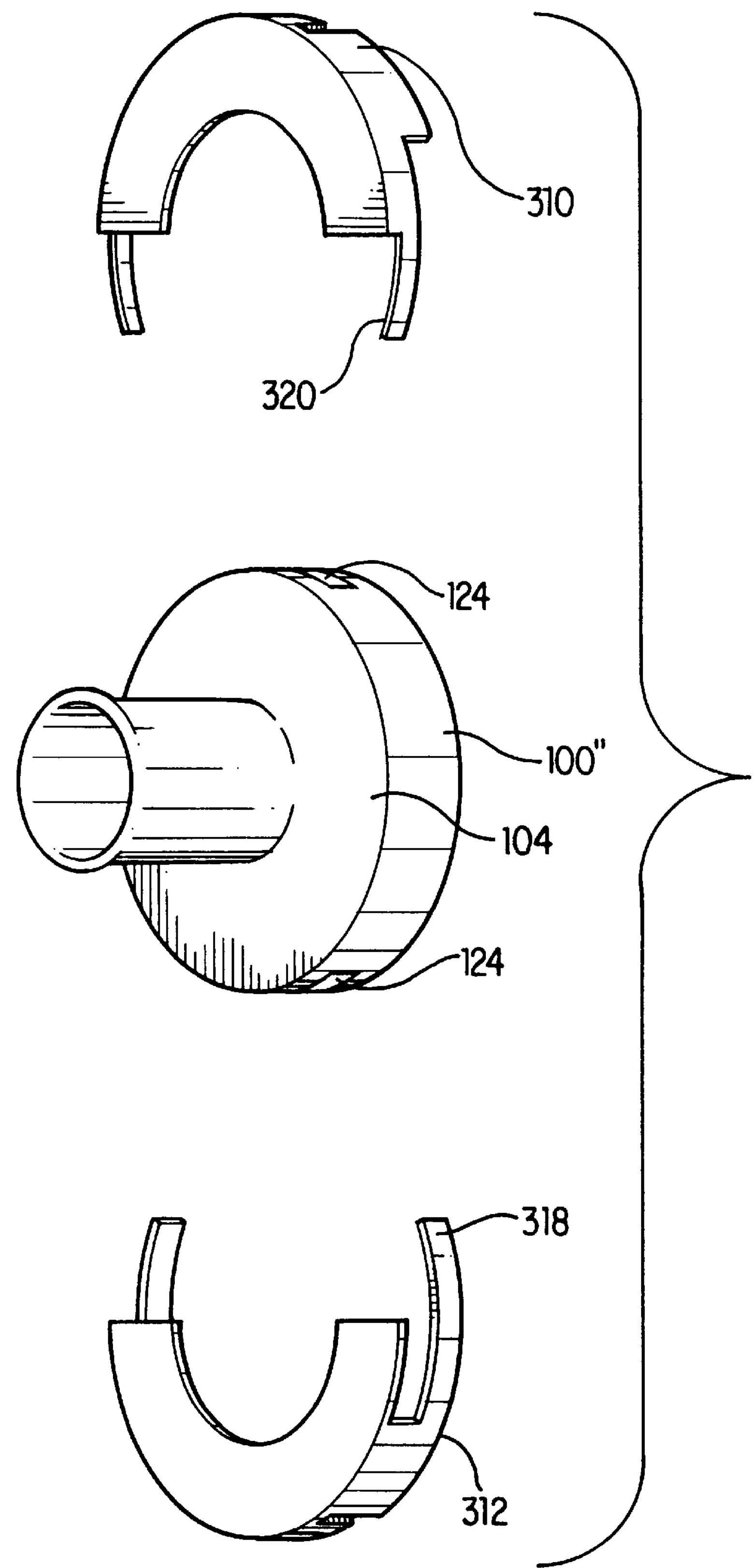
FIG. 29 is an exploded view of the grommet assembly as shown in FIG. 27.

FIGS. 27–29 illustrate an alternative arrangement for the rigid plate member. As shown in FIG. 27, the rigid plate member is a two-part assembly including a first piece 310 and a second piece 312. The second piece 312 includes a lower engaging part 318, and the first piece 310 includes an upper engaging part 320. The upper engaging part 320 is engaged within a recess of the second piece 312, and the lower engaging part 318 is received within a recess formed in the first piece 310.

As shown in FIG. 28, the first piece 310 includes a bent portion 316, and the second piece 312 includes a bent portion 314. The bent portions 314 and 316 fit within corresponding radial recesses 124 provided in a main grommet body 100". FIG. 29 is an exploded view of the two-part rigid plate assembly and illustrates the radial recesses 124 which receive the bent portions 314 and 316 of the first and second pieces 310 and 312. Other shapes for the first and second pieces 310, 312 are also within the scope of the invention so long as they collectively cover substantially the entire pressure receiving portion of the second surface 104 of the main grommet body 100".

Figure 30:
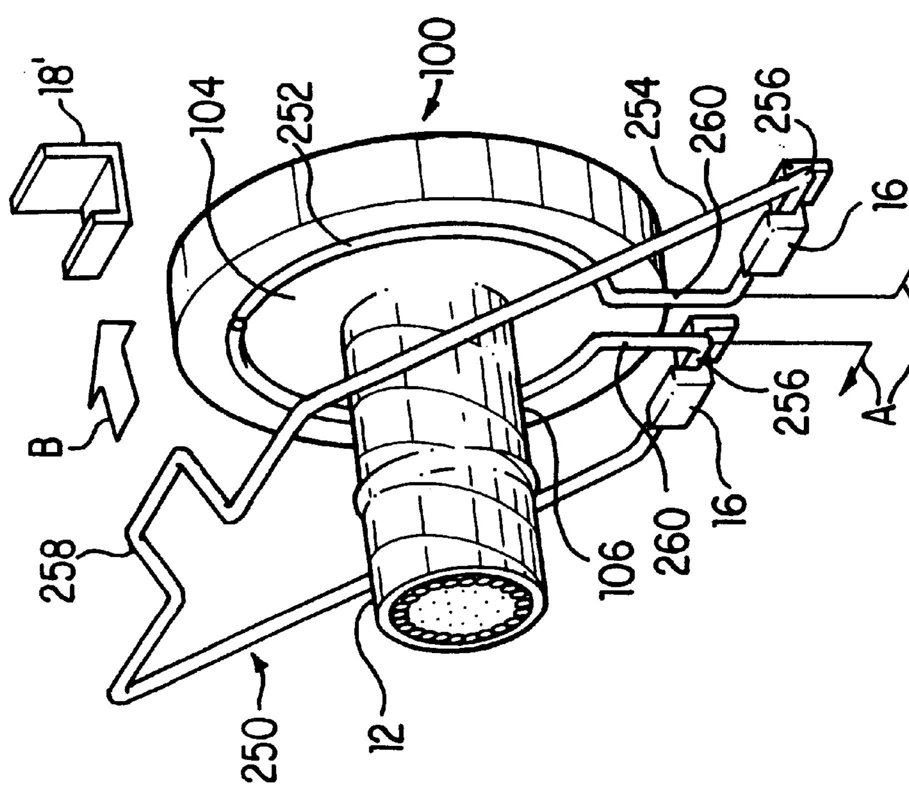
FIG. 30 is a perspective view of a modified wire spring according to the present invention.

FIG. 30 shows a metallic wire spring 250 constituting the pressing member of the two-part grommet assembly. The wire spring 250 includes a substantially circular inner member 252 and a substantially rectangular outer member 254. The inner member 252 contacts the second surface 104 of the main grommet body and the outer member attaches to brackets 16 and 18' formed on the vehicular wall panel 14. The brackets 16 shown in FIG. 30 are similar to the bracket 16 shown in FIGS. 3–5. However, the bracket 18' is a U-shaped member structured to receive a hook portion 258 that is formed as an integral part of the outer member 254. To attach the wire spring 250 to the main grommet body 100, a pair of connector legs 260 are twisted to expand the distance between the leg portions 260 to a distance that is greater than the diameter of the hollow cylindrical extension 106. the opposed arrows A in FIG. 30 illustrate the expansion. However, the wire spring 250 can be preassembled to the main grommet body 100 before the wire harness 12 is inserted within the hollow cylindrical extension 106. In either assembly process, the inner member 252 is set to lightly rest against the second surface 104 in the position shown in FIG. 30. At this point, a pair of double looped bracket engaging portions 256 are engaged with the brackets 16.

Figure 31:
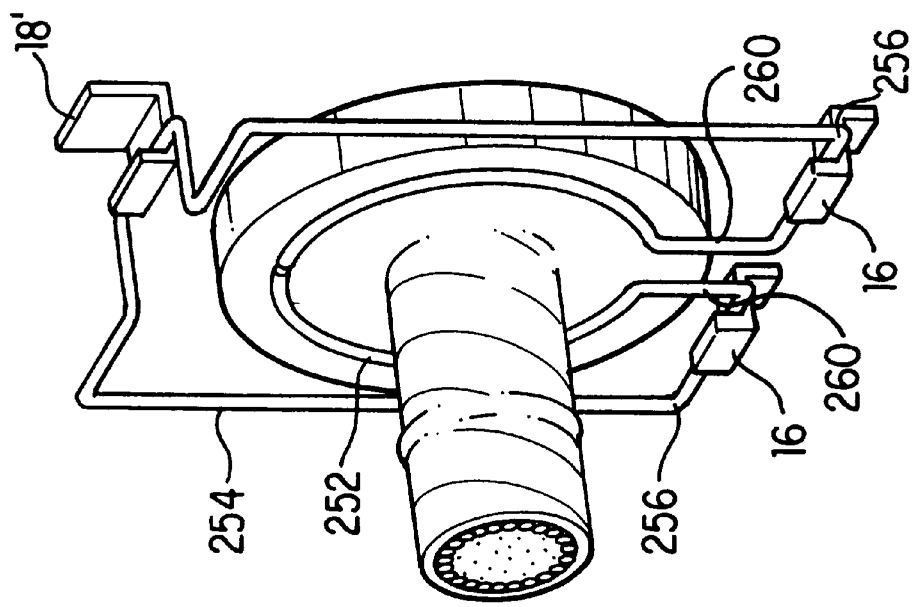
FIG. 31 is a perspective view of the modified wire spring as shown in an assembled position.

In the position shown in FIG. 30, the inner member 252 is in a first plane parallel to the plane in which the second surface 104 is located. The outer member 254 is provided in a plane disposed at an angle with respect to the plane of the inner member 252. The outer member is then pivoted in the direction of the top arrow B to engage the hook portion 258 with the bracket 18'. During this operation, the wire spring 250 is easily bent such that the spring energy stored in the relaxed position is converted into a pressing force which maintains the seal between the main grommet body 100 and the wall panel 14. FIG. 31 shows the outer member 254 after it has been pivoted into the assembled position.

FIGS. 32–37 illustrate another two-part grommet assembly according to the present invention. Like the previously described grommet assembly embodiments, the embodiment of FIGS. 32–37 includes a main grommet body and a pressing member that applies a force to the main grommet body.

Figure 32:
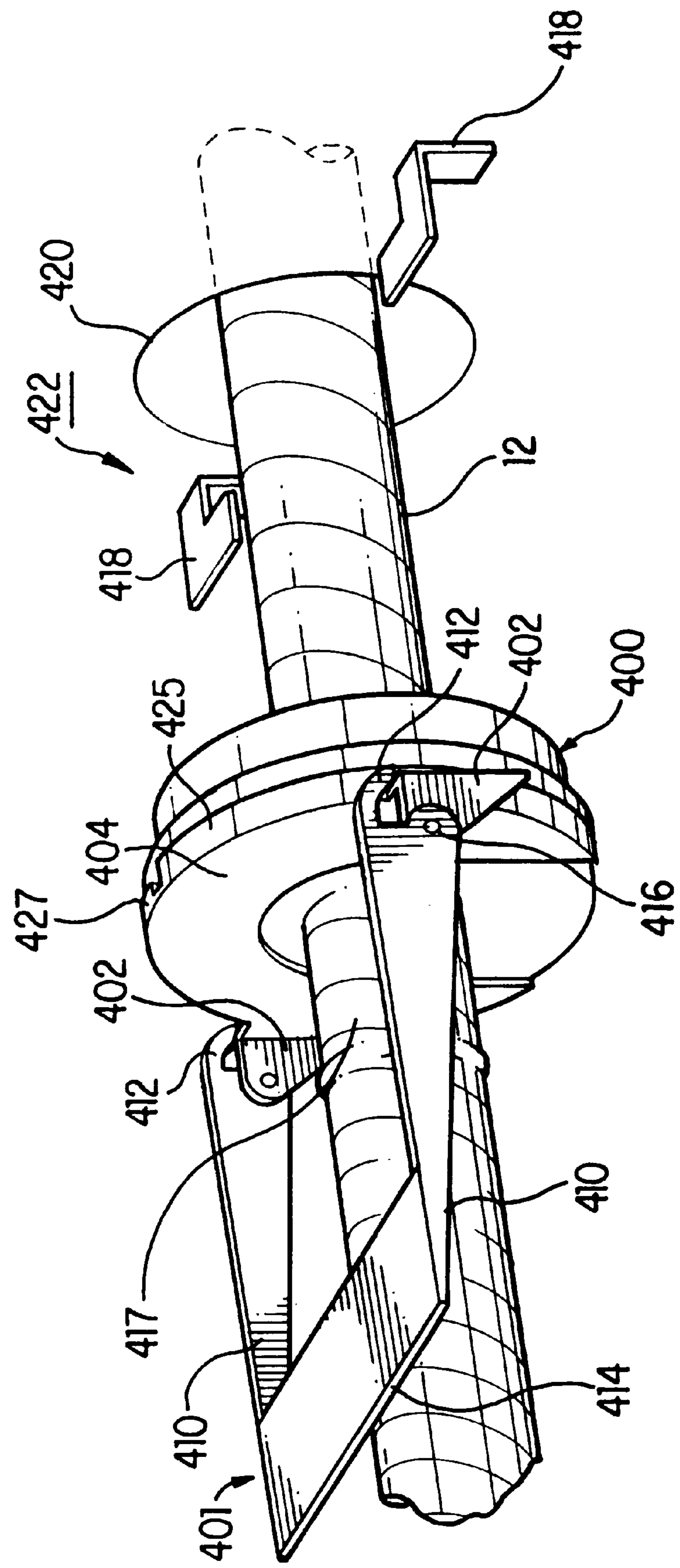
FIG. 32 illustrates another two-part grommet assembly according to the present invention prior to attachment to a vehicular wall panel.

As shown in FIG. 32, the two-part grommet assembly includes a main grommet body 400 and pressing member including a rigid plate member 404. The main grommet body 400 can be similar to the main grommet body described in previous embodiments. The rigid plate member 404 includes at least one tabbed hinge portion 402. In FIG. 32, a pair of tabbed hinge portions 402 are provided. A pivotable pressing member 401 is attached to the tabbed hinge portions 402.

The pivotable pressing member 401 includes an arm portion 410 that is attached via a hinge 416 to each tabbed hinge portion 402. The pivotable pressing member 401 is pivotal between a first position to apply a pressing force to seal the main grommet body 400 against a vehicular wall panel 422 and a second position to release the pressing force.

The pivotable pressing member 401 includes a handle or gripping portion 414 attached to the arm portions 410 and a hook portion 412 opposite to the gripping portion 414. The hinge 416 serves as a fulcrum and is located between the gripping portion 414 and the hook portion 412.

As shown in FIG. 32, the two-part grommet assembly is inserted into an opening 420 provided in the vehicular wall panel 422. The hook portions 412 are aligned with bracket portions 418 mounted on the vehicular wall panel 422.

Figure 33:
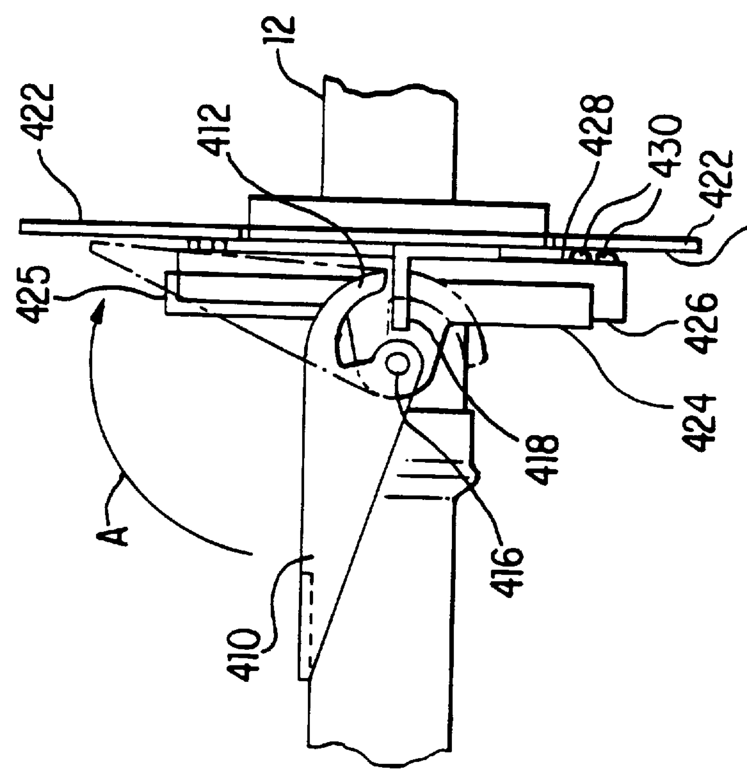
FIG. 33 illustrates a side view of the grommet assembly according to FIG. 32.

FIG. 33 shows the grommet assembly and harness 12 after insertion thereof within the opening 420. From this position, the pivotable pressing member 401 is pivoted along a path shown by the arrow A into a position shown in the phantom dot and dash line. During pivoting action, each hook portion 412 engages with its respective bracket 418. At that time, a pressing force from the rigid plate member is applied from a second surface 426 to a first surface 428 of the main grommet body 400 which includes sealing lips 430. The sealing lips 430 form a waterproof seal with an external surface **422*e* of the vehicular wall panel 422**.

Figure 34:
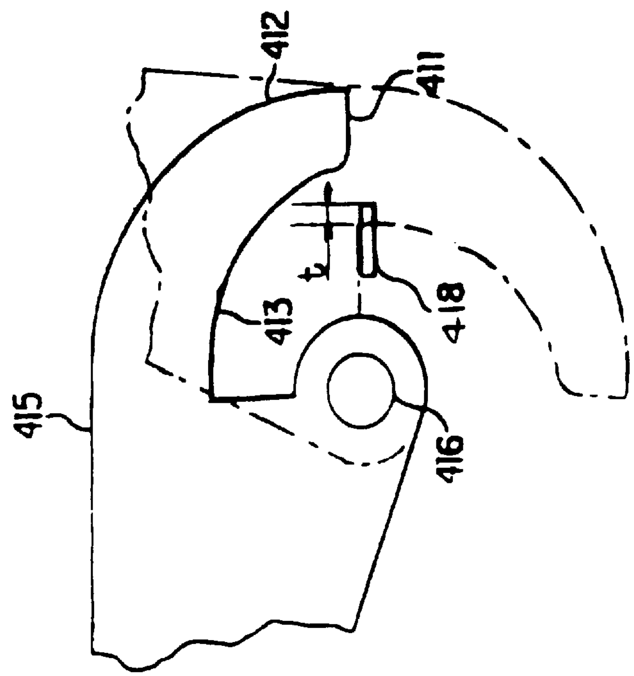
FIG. 34 illustrates an enlarged detail view of the pivotable arm according to the present invention.

As shown in FIG. 34, the hook portion 412 comprises a cam member having a width in the plane of the paper that increases from the distal end 411 thereof towards a proximal end 415 thereof adjacent the hinge 416 (FIG. 33). After pressing the sealing lips 430 to the vehicular wall panel 422, when the pressing member 401 is rotated toward the vehicular wall panel 422, the bracket 418 and the inside surface 413 are in an overlapped relationship shown by the dashed (phantom) line. The overlapping measurement t ranges between 0.5 millimeters and 1.5 millimeters. Preferably, the overlap is 1.0 millimeters. With this structure, the distal end 411 having a narrow width can fit between the bracket 418 and the vehicular wall panel 422. However, as the pivotable pressing member 401 is pivoted into the engaged position, the width of the hook portion 412 increases such that an inside surface 413 of the hook portion 412 adjacent the bracket 418 engages with the bracket 418. A pressing force gradually develops between the inside surface 413 of the hook portion 412 and the bracket 418. The pressing force is transferred to establish firm contact between the sealing lips 430 and the exterior surface **422*e* of the vehicular wall panel 422**.

Figure 37:
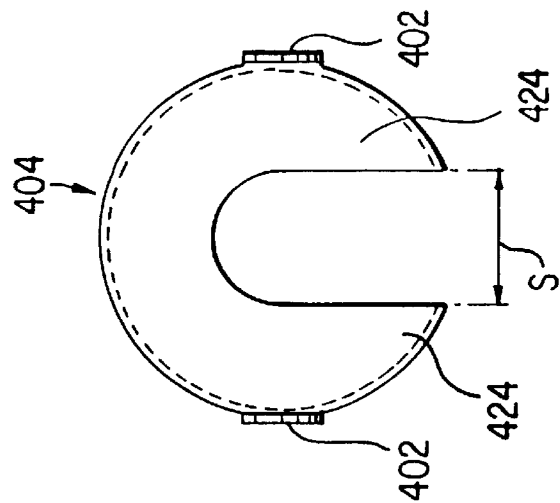
FIG. 37 is a plan view of the rigid plate member according to the present invention.
Figure 36:
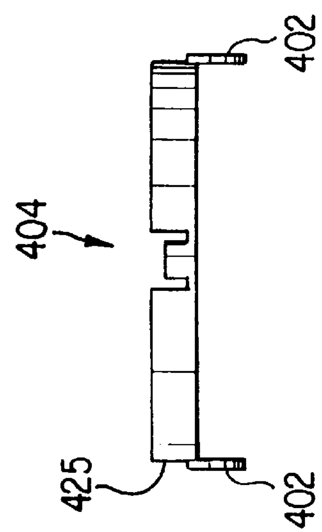
FIG. 36 is an elevation view of the rigid plate member according to the present invention.
Figure 35:
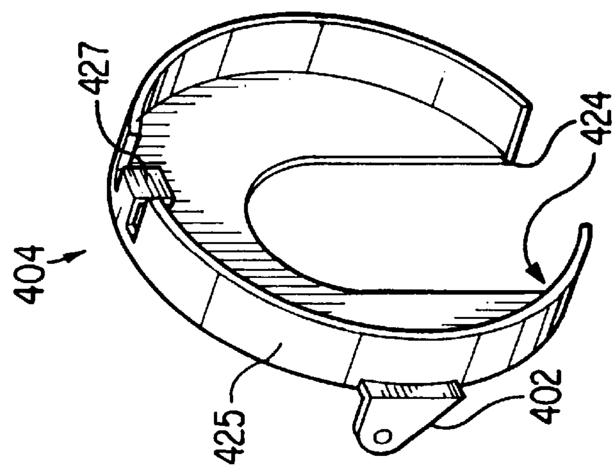
FIG. 35 illustrates a reverse perspective view of the rigid plate member shown in FIGS. 32 and 33.

FIG. 35 shows a detail reverse perspective view of the rigid plate member 404. The rigid plate member 404 is similar to the rigid plate member 300 shown in FIG. 26 and includes a rim 425 and bent portions 427 that engage with recesses provided or formed in the main grommet body 400. FIGS. 36 and 37 illustrate, respectively, elevation and plan views of the rigid plate member 404. In FIG. 37, the rigid plate member 404 has a shape approximating an upside-down U. Ends 424 of the rigid plate member 404 define a space S which is larger than a diameter d of a hollow cylindrical member or extension 417. Accordingly, like the rigid plate member 300 shown in FIG. 25, the rigid plate member 404 can be fit into place even after the wire harness 12 is installed into the main grommet body 400.

The invention has been described with reference to preferred embodiments thereof, which are intended to be illustrative, not limiting. Various modifications can be made to the above preferred embodiments without departing from the spirit or scope of the invention as defined in the appended claims.

What is claimed is:

1. A grommet assembly for a vehicle comprising:

a main grommet body having a centrally located wire harness aperture, a first surface including a sealing portion and a second surface opposite to the first surface in a longitudinal direction of the wire harness aperture; and an elastic member that applies a pressing force on the second surface at a position substantially opposite the sealing portion.

2. The grommet assembly according to claim 1, wherein said elastic member is a metallic wire spring having a round cross-section.

3. The grommet assembly according to claim 2, wherein the metallic wire spring includes a substantially circular inner member and a substantially rectangular outer member, the inner member contacting the second surface and the outer member attaching with mounting structure formed on a vehicle.

4. The grommet assembly according to claim 3, wherein the outer member includes first and second opposed mounting portions, the first mounting portion defining a double loop structure engagable with the mounting structure.

5. The grommet assembly according to claim 3, wherein the inner and outer members are connected via connection legs.

6. The grommet assembly according to claim 1, wherein said elastic member is a metallic spring having a rectangular cross-section.

7. The grommet assembly according to claim 1, wherein said sealing portion includes sealing lips, and said elastic member is aligned with said sealing lips.

8. The grommet assembly according to claim 7, wherein the first surface includes a circumferential flange disposed radially inward of said sealing lips.

9. The grommet assembly according to claim 1, further comprising a hollow cylindrical extension protruding from said second surface that is aligned with said wire harness aperture.

10. The grommet assembly according to claim 9, further comprising a brim extending radially away from the hollow cylindrical extension, said brim having an inner surface that faces the second surface of the main grommet body and defining a gap between the inner surface and the second surface within which the elastic member can move prior to assembly.

11. The grommet assembly according to claim 10, wherein said brim is a substantially solid disk-shaped member.

12. The grommet assembly according to claim 10, wherein said brim comprises a plurality of substantially flat blade members disposed circumferentially about said hollow cylindrical extension.

13. The grommet assembly according to claim 9, wherein said hollow cylindrical extension comprises a distal end having a first diameter and a proximal end having a second diameter, larger than the first diameter, that supports the elastic member in substantial alignment with the second surface of the main grommet body prior to assembly.

14. The grommet assembly according to claim 13, further comprising a plurality of substantially planar blade members disposed circumferentially about and substantially between said first and second diameter portions.

15. The grommet assembly according to claim 9, further comprising a plurality of projections extending away from the second surface and substantially parallel to the hollow cylindrical extension.

16. The grommet assembly according to claim 15, wherein each of the projections includes a brim portion having an inner surface that faces the second surface.

17. The grommet assembly according to claim 9, wherein said elastic member is a metallic spring member that has a shape that is substantially concentric with said hollow cylindrical member.

18. The grommet assembly according to claim 9, further comprising a planar guide member extending from said hollow cylindrical portion to said second surface.

19. The grommet assembly according to claim 1, wherein said elastic member comprises a wire spring having an open end and a closed end opposite to said open end.

20. The grommet assembly according to claim 19, wherein said open and closed ends are connected by semicircular portions of the wire spring.

21. The grommet assembly according to claim 20, wherein the semicircular portions include a wave-like formation for uniformly distributing the pressing force applied to the second surface.

22. The grommet assembly according to claim 19, wherein the closed end portion includes two substantially parallel and L-shaped members and a lateral connecting member connecting the two L-shaped members.

23. The grommet assembly according to claim 22, wherein the two L-shaped members are resiliently movable from a normal position to an expanded position to secure the wire spring with respect to a bracket mounted on a vehicle.

24. The grommet assembly according to claim 19, wherein the open end includes two leg portions formed adjacent one another.

25. The grommet assembly according to claim 19, wherein said open end defines a first bracket engaging part that engages a first bracket mounted on a vehicle panel and the closed end defines a second bracket engaging part that engages a second bracket mounted on the vehicle panel.

26. The grommet assembly according to claim 25, wherein the first and second bracket engaging parts are substantially triangular in shape such that semicircular portions connecting the open and closed ends are positioned closely adjacent one another.

27. The grommet assembly according to claim 25, wherein the first bracket engaging part includes two leg portions each having a bent distal end that extends away from said second surface, and said first bracket includes a bracket mounting hole for receiving the bent distal end of each of the two leg portions.

28. The grommet assembly according to claim 27, wherein said first bracket further comprises a support wall formed opposite to the bracket mounting hole, the support wall forming a recess within the first bracket for receiving the bent distal ends of each of the two leg portions.

29. The grommet assembly according to claim 25, wherein said first bracket includes a flange that engages said open end, and the second bracket includes an arrow shaped member including an enlarged head portion and a reduced thickness portion, the head portion forcing opposite portions of the closed end from a normal condition to an expanded condition until the opposite portions reach the reduced thickness portion, whereby the opposite portions of the closed end return to the normal condition to secure the wire spring in place with respect to the second bracket.

30. The grommet assembly according to claim 25, wherein circumferential portions of the main grommet body proximate said first and second bracket engaging parts receive an increased force that is greater than said pressing force.

31. The grommet assembly according to claim 30, wherein the first and second brackets are closely spaced from said vehicle panel so as to compress the circumferential edges of the main grommet body.

32. The grommet assembly according to claim 1, further comprising a rigid plate member interposed between said main grommet body and said elastic member.

33. The grommet assembly according to claim 32, wherein the rigid plate member comprises a substantially U-shaped member, wherein an open end of the U-shaped rigid plate member has a width at least equal to a diameter of a hollow cylindrical portion of said main grommet body that extends away from the second surface.

34. The grommet assembly according to claim 33, wherein the U-shaped rigid plate member comprises:

a first planar surface substantially parallel to the second surface; and a rim perpendicular to and extending at least partially around an outer circumference of the first planar surface, an inner surface of the rim contacting a circumferential side surface of the main grommet body.

35. The grommet assembly according to claim 34, wherein said rim includes at least one inner projection that is insertable into the circumferential side surface.

36. The grommet assembly according to claim 32, wherein said rigid plate member comprises first and second plate portions that cooperate to engage said second surface, each of said plate portions including a rim and at least one inner projection that penetrates into a circumferential surface of the main grommet body.

37. The grommet assembly according to claim 1, further comprising means for uniformly distributing the pressing force from the elastic member to the main grommet body.

38. The grommet assembly according to claim 37, wherein the means comprises a rigid plate member.

39. The grommet assembly according to claim 37, wherein the means comprises a wavelike formation on the elastic member in contact with the second surface.

40. The grommet assembly according to claim 37, wherein the elastic member includes semicircular portions connected by opposed open and closed ends, and the means comprises forming the opposed open and closed ends in substantially triangular shapes such that the semicircular portions are positioned closely adjacent one another.

41. The grommet assembly according to claim 37, wherein the means includes means for pressing the elastic member against the main grommet body such that a circumferential edge of the main grommet body receives an increased compression force compared to the pressing force.

* * * * *